US006671717B1

(12) United States Patent
Shaffer et al.

(10) Patent No.: US 6,671,717 B1
(45) Date of Patent: Dec. 30, 2003

(54) MAINTAINING DATA COLLABORATION CONFERENCES

(75) Inventors: Shmuel Shaffer, Palo Alto, CA (US); Charles J. Bedard, Saratoga, CA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 09/572,115

(22) Filed: May 17, 2000

(51) Int. Cl.$^7$ .............................................. G06F 15/16
(52) U.S. Cl. ...................... 709/204; 709/224
(58) Field of Search ............................... 709/204, 205, 709/223, 224; 370/260

(56) References Cited

U.S. PATENT DOCUMENTS

| | | | | |
|---|---|---|---|---|
| 4,529,842 A | * | 7/1985 | Levy et al. ..................... 714/4 |
| 4,847,829 A | * | 7/1989 | Tompkins et al. ........... 370/260 |
| 5,724,508 A | * | 3/1998 | Harple et al. ................. 709/205 |
| 6,078,957 A | * | 6/2000 | Adelman et al. ............ 709/224 |
| 6,226,376 B1 | * | 5/2001 | Horan .................... 379/373.02 |
| 6,529,978 B1 | * | 3/2003 | Eide et al. ................... 710/104 |

* cited by examiner

*Primary Examiner*—Mehmet B. Geckil
(74) *Attorney, Agent, or Firm*—Campbell Stephenson Ascolese LLP

(57) ABSTRACT

A method and system for maintaining a data collaboration conference. In one embodiment, a method includes but is not limited to monitoring for a presence of a first general conference controller having top provider status, and promoting at least a second general conference controller one level in status hierarchy in response to the monitoring indicating that the first general conference controller is no longer viable. In one embodiment, hardware and software are utilized to effect the foregoing described method. In one embodiment, a method includes but is not limited to monitoring for the presence of a first general conference controller having top provider status; promoting at least a second general conference controller one level in status hierarchy in response to the monitoring indicating that the first general conference controller is no longer viable; and directing that the second general conference controller assume to provider status, in response to a determination that the second general conference controller has been promoted to top provider status. In one embodiment, hardware and software are utilized to effect the foregoing described method.

44 Claims, 7 Drawing Sheets

US 6,671,717 B1

MAINTAINING DATA COLLABORATION CONFERENCES

BACKGROUND OF THE INVENTION

1. Field of the Invention

The present invention is related to a method and system to be utilized in at least one data communications network wherein data collaboration conferences are established.

2. Description of the Related Art

A data communications network is the interconnection of two or more communicating entities (i.e., data sources and/or sinks) over one or more data links. A data communications network allows communication between multiple communicating entities over one or more data communications links.

A data communications network can be used to support a data collaboration conference, such as that defined by the International Telecommunications Union's (ITU's) T.120 standard, [T.120] Recommendation T.120 (07/96)—Data protocols for multimedia conferencing, which is hereby incorporated by reference in its entirety. With reference now to FIG. 1, shown is a data communications network in a data collaboration conference configuration. Depicted are four humans A, B, C and D interacting with communication programs on computers 102, 104, 106, and 108 in order to participate in the data collaboration conference.

In a data collaboration conference participants participate much as they would if they were in a physical conference room having a physical whiteboard. In a data collaboration conference, participants typically have displayed on their computer screens something akin to a "virtual" whiteboard. Each user can "mark" on his or her whiteboard (typically via use of a mouse or other input device), and such "marking" on the whiteboard will almost simultaneously be displayed on the computer screens of the other participants in the data collaboration conference. Consequently, the interaction of humans A, B, C, and D with their communication programs typically involves the utilization of microphones, speakers, keyboards, and/or graphical user interfaces on computers 102, 104, 106, and 108.

A few of the communication programs which typically support data collaboration conferences are shown running on computers 102, 104, 106, and 108. Shown resident within and running on computers 102, 104, 106, and 108 are TCP/IP communications programs 120, 140, 160, and 180, respectively. Each such TCP/IP communications program allows, among other things, higher level entities to communicate over-TCP/IP network 150.

Shown resident within and running on computers 102, 104, 106, and 108 are multi-point communication system programs (MCSes) 122, 142, 162, and 182 respectively. Each such MCS ensures, among other things, that data collaboration occurs in that each MCS communicates with other MCSes to ensure that actions taken on the "virtual" whiteboard appear consistently across computers 102, 104, 106, and 108.

Shown resident within and running on computer 102 is generic conference controller program (GCC) 124. In a data collaboration conference, the GCC serves to ensure that the data collaboration occurs in an orderly fashion. In the related art, typically the computer system associated with the initiator of the data collaboration conference activates its GCC and thereafter assumes the GCC role for the duration of the data collaboration conference (e.g., if user A originated the data collaboration conference, GCC 124 would be activated and would assume the GCC role). (In the related art, GCCs are also typically resident on each computer system participating in the data collaboration conference. However, insofar as such GCCs are not generally active (typically remaining unloaded and/or dormant) unless the computer upon which a GCC is resident initiated the data collaboration conference, such GCCs are not shown in this related art section for sake of clarity.)

As a relatively expensive alternative to the foregoing, in the related art it has been recognized that if GCC 124 becomes no longer viable, such as for example when GCC 124 has an internal error, or if computer 102 wherein GCC 124 resides must be restarted (e.g., due to failure of computer 102's operating system), or if for some reason human user A elects to take computer 102 out of the data collaboration conference, then the entire data collaboration conference tends to fail. Accordingly, in the related art an extra server entity (not shown) is sometimes utilized to provide the functioning of the GCC.

As used in this context, the "extra server entity" refers to an additional computer system/embedded computer which—unlike computer 102 which is typically running many other computer programs besides GCC 124—is almost exclusively dedicated to running the additional GCC communication program. Since the extra server entity is almost exclusively dedicated to running the additional GCC communication program, it has a higher fault tolerance and generally has higher availability than computers (such as computer 102) which are not so dedicated.

It has been discovered by the inventors named herein ("inventors"), that the prior art solution of providing the extra server entity as a means for keeping the data collaboration conference "on-line" is an expensive option for many businesses, especially smaller ones. It has been posited by the inventors that the art would benefit from a method and system which extend data collaboration conference capabilities such that if the GCC goes down, the conference will continue with little or no inconvenience to the conference participants, but will do so in such a way that the extra server entity, as used in the related art, is not required.

SUMMARY OF THE INVENTION

The inventors named herein have devised a method and system for maintaining a data collaboration conference. In one embodiment, a method includes but is not limited to monitoring for the presence of a first general conference controller having top provider status, and promoting at least a second general conference controller one level in status hierarchy in response to the monitoring indicating that the first general conference controller is no longer viable. In one embodiment, hardware and/or software is utilized to effect the foregoing described method.

In one embodiment, a method includes but is not limited to monitoring for the presence of a first general conference controller having top provider status; promoting at least a second general conference controller one level in status hierarchy in response to the monitoring indicating that the first general conference controller is no longer viable; and directing that the second general conference controller assume to provider status, in response to a determination that the second general conference controller has been promoted to top provider status. In one embodiment, hardware and/or software is utilized to effect the foregoing described method.

In one embodiment a method for managing a hierarchy of alternate General Conference Controllers (GCCs) includes but is not limited to reassigning the hierarchy of alternate GCCs in an event that one or more alternate GCCs become not viable. In one embodiment, hardware and/or software is utilized to effect the foregoing described method.

In one embodiment, a method for updating one or more alternate top provider General Conference Controllers (GCCs) as to a current status of the top provider GCC includes but is not limited to informing the one or more alternate top provider GCCs as to the state of a GCC having top provider status. In one embodiment, hardware and/or software is utilized to effect the foregoing described method.

The foregoing is a summary and thus contains, by necessity, simplifications, generalizations and omissions of detail; consequently, those skilled in the art will appreciate that the summary is illustrative only and is not intended to be in any way limiting. Other aspects, inventive features, and advantages of this patent application will become apparent in the non-limiting detailed description set forth below.

BRIEF DESCRIPTION OF THE DRAWINGS

The present invention may be better understood, and its numerous objects, features, and advantages made apparent to those skilled in the art by referencing the accompanying drawings.

The use of the same reference symbols in different drawings indicates similar or identical items.

DETAILED DESCRIPTION

Figure 1:
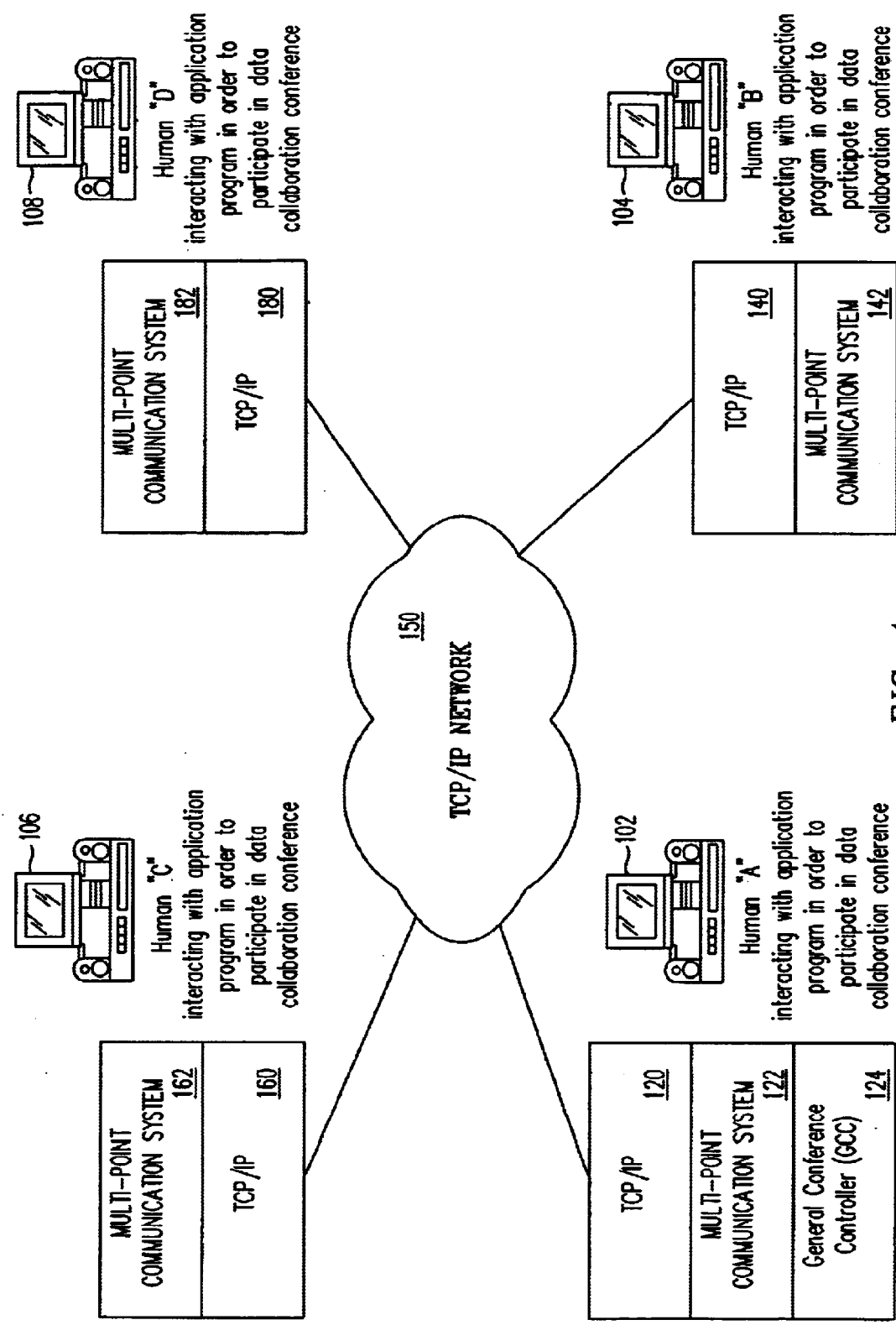
FIG. 1 depicts a data communications network in a data collaboration conference configuration.
Figure 2:
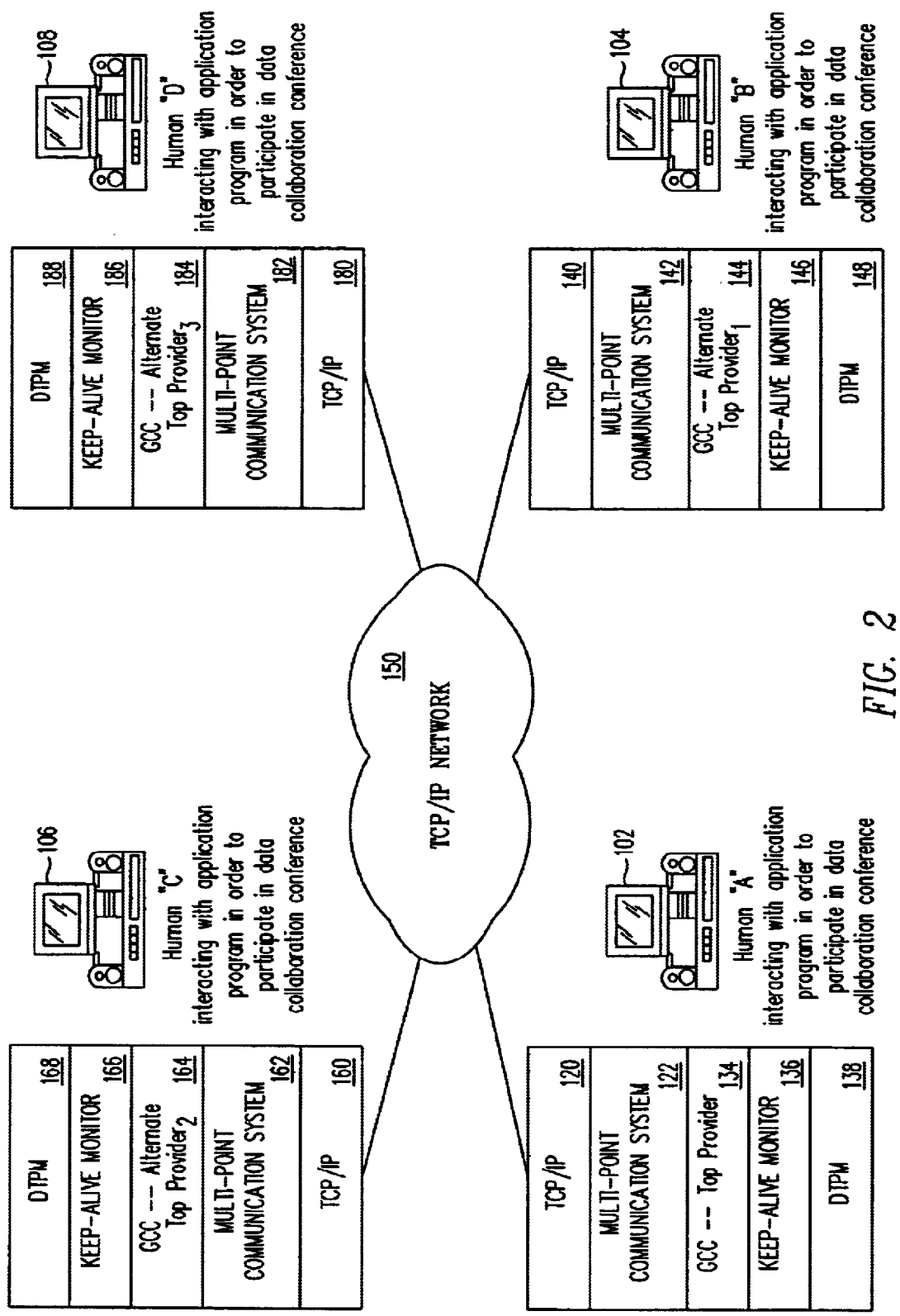
FIG. 2 is an embodiment of the present invention.

Referring now to FIG. 2, shown is an embodiment of the present invention. Shown is that in addition to the components shown and described in relation to related-art FIG. 1, in FIG. 2, computers 102, 104, 106, and 108 are shown respectively to have GCCs 134, 144, 164, and 184; keep-alive monitors 136, 146, 166, and 186; and distributed top provider managers (DTPMs) 138, 148, 168, and 188, respectively. Notice that unlike in the related art, in Figure GCCs 144, 164, and 184 on computers 104, 106, and 108 are all loaded and active, albeit in an standby or alternate top provider role, as described below.

Note that GCC 134 is shown as having top provider status, GCC 144 is shown as having alternate top provider$_1$ status, GCC 164 is shown as having alternate top provider$_2$ status, and GCC 184 is shown as having alternate top provider$_3$ status. GCC 134, having top provider status, functions substantially analogously to GCC 124, except that GCC 134 having top provider status is in relatively constant communication with GCC 144 having Alternate Top Provider$_1$ status. In the course of such near-constant communication, GCC 134 shown as having top provider status essentially constantly updates GCC 144 shown as having alternate top provider$_1$status as to the state of the data collaboration conference. Should it be determined that GCC 134 having top provider status has gone "off-line," or is no longer functioning, the top provider status "migrates" to the GCC holding first alternate status, resulting in the network state shown in FIG. 3. In other words, GCC 134 shown as having top provider status essentially constantly updates GCC 144 shown as having alternate top provider$_1$ status so as to substantially ensure that GCC 144 shown as having alternate top provider$_1$ status can assume top provider status with a minimum of disruption to the ongoing data collaboration conference, should it be detected that that GCC 134 has become not viable.

Figure 3:
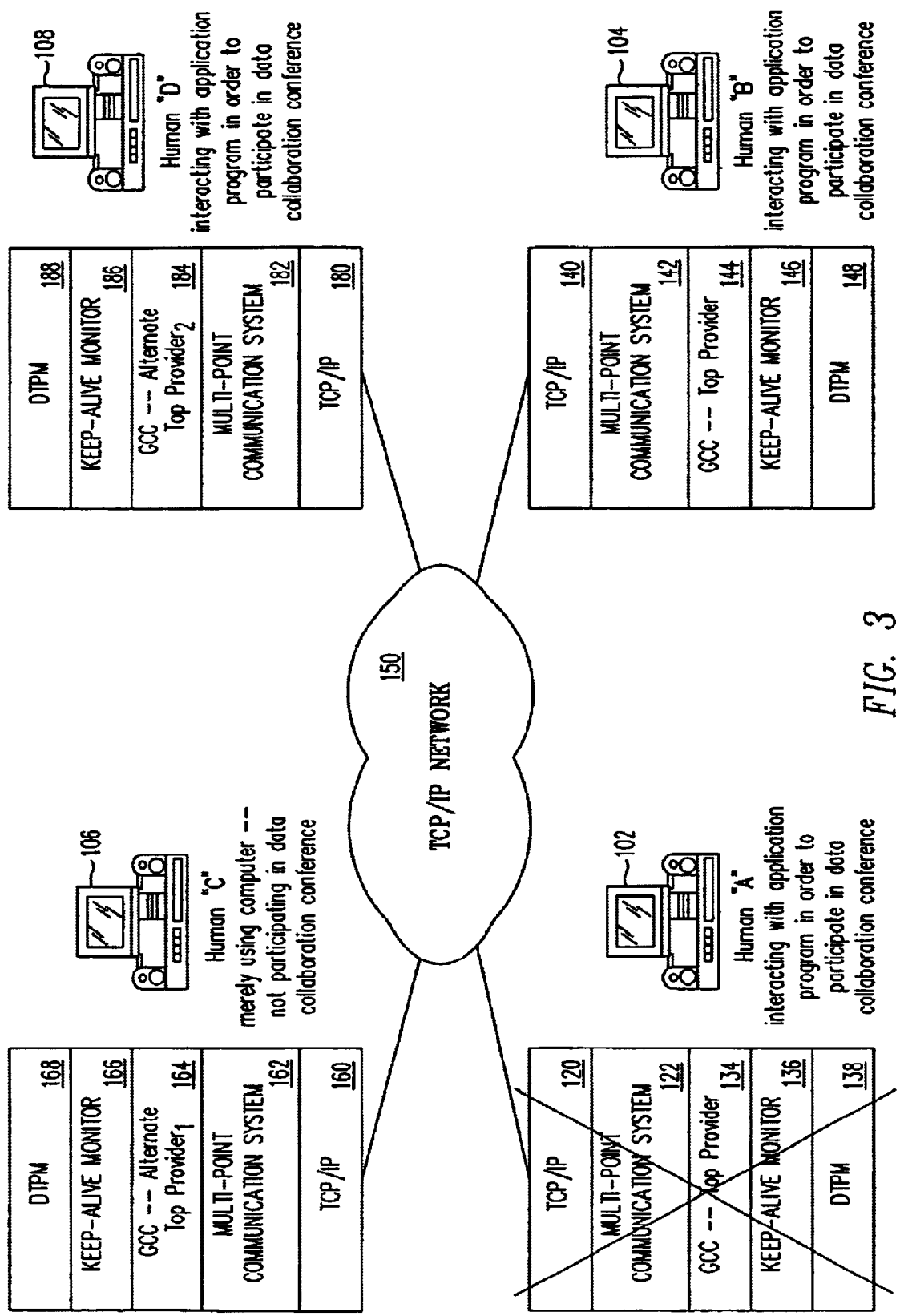
FIG. 3 illustrates that GCC 134 has gone "off-line," and that subsequently GCC 144, previously having alternate top provider$_1$ status, has been promoted to become GCC 144 having top provider status.

With reference now to FIG. 3, shown is that GCC 134 has gone "off-line" (illustrated by a large "X" drawn through the program stack containing GCC 134), and that subsequently GCC 144, previously having alternate top provider$_1$ status, has been promoted to become GCC 144 having top provider status. Subsequent to the promotion of GCC 144 to top provider status, GCC 144 takes over the functions which were being provided by GCC 134 prior to GCC 134 having gone off-line. Subsequent to GCC 144 attaining top provider status, GCC 144 updates all remaining data collaboration conference participants with the last consistent state of the data collaboration conference prior to GCC 134 having gone off-line.

In addition to the foregoing, further depicted is that GCC 164 and GCC 184 have been respectively promoted to GCC 164 having alternate top provider$_1$ status and GCC having alternate top provider$_2$ status. The promotions of GCC 164 and GCC 184 took place substantially simultaneously with the promotion of GCC 144 to top provider status.

Figure 4:
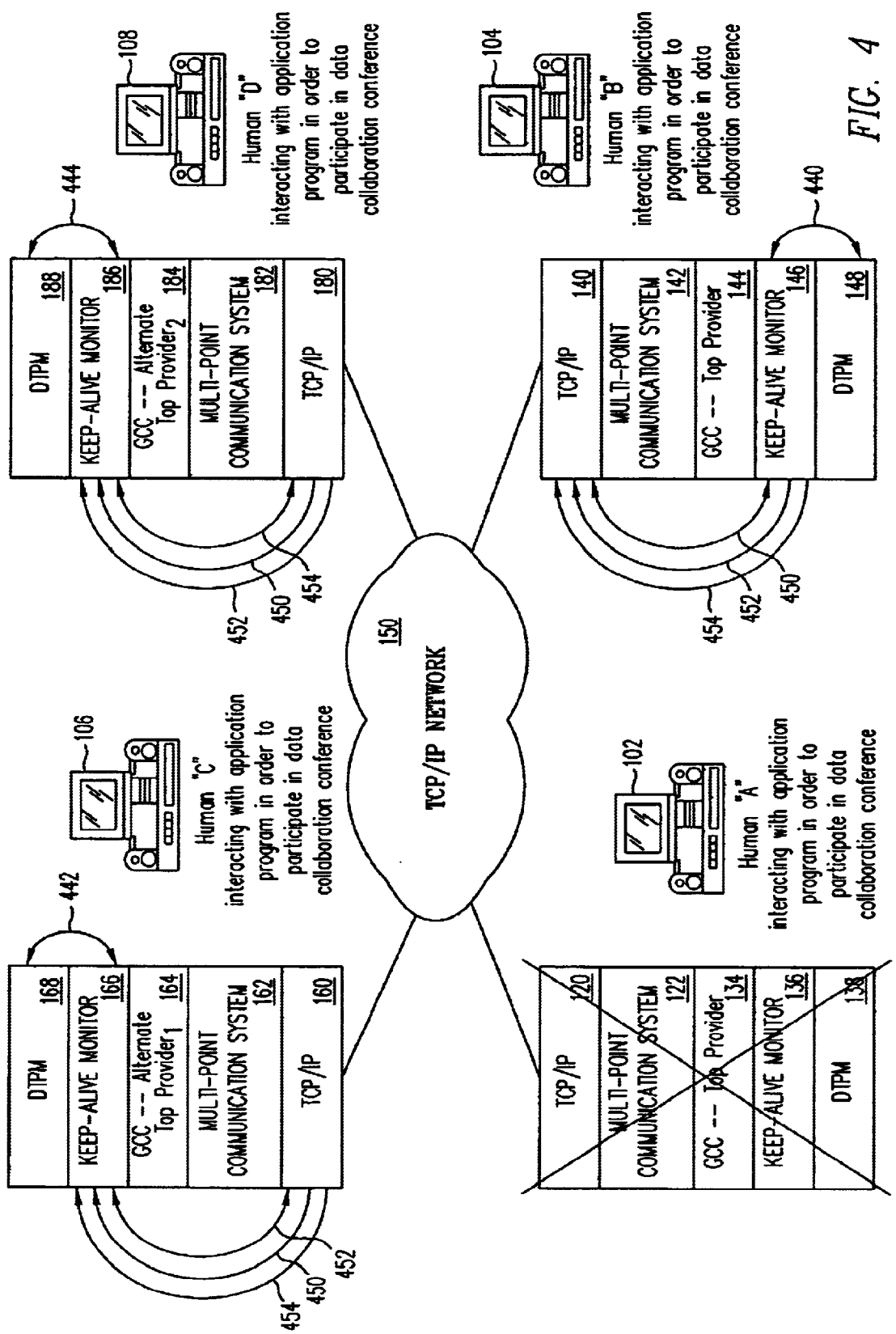
FIG. 4 illustrates that Distributed Top Provider Managers (DTPMs) 148, 168, and 188 respectively resident within computers 104, 106, and 108 are in near-constant contact with keep-alive monitors 146, 166, and 186 via monitoring channels 440, 442, and 444.

The foregoing discussion has described GCCs 144, 164, and 184 as being "promoted." How such promotion is achieved in one embodiment is shown in FIG. 4.

Referring now to FIG. 4, shown is that DTPMs 148, 168, and 188 respectively resident within computers 104, 106, and 108 are in near-constant contact with keep-alive monitors 146, 166, and 186 via monitoring channels 440, 442, and 444. Illustrated is that keep-alive monitors 146, 166, and 186 by and through TCP/IP communications programs 120, 140, 160, and 180, respectively, are in near-constant contact with each other (i.e., each keep alive monitor communicates with all other keep alive monitors) via keep-alive channels 450, 452, and 464. In one embodiment, keep-alive monitors 146, 166, and 186 are equipped to perform what is known in the art as a "keep-alive" function, whereby they can consistently ping each other to ensure that the GCCs respectively associated with the keep-alive monitors are all up and running. In this fashion keep-alive monitors 146, 166, and 186 can become aware that GCC 134 is no longer viable.

In addition or in the alternative to the foregoing embodiment whereby the keep alive monitors detect that GCC 134 is no longer viable, in another embodiment keep-alive monitors 146, 166, and 186 monitor their respective TCP/IP communications programs 140, 160, and 180, in order to determine if the node associated with GCC 134 is still "on-line." Should keep-alive monitors 146, 166, and 186 detect that the node (e.g., TCP/IP communication program 120) is no longer viable, the keep-alive monitors 146, 166, and 186 will respectively alert their respective DTPMs 148, 168, and 188 that GCC 134 is no longer viable.

In response to learning from their respective keep-alive monitors 146, 166, and 186 that the node having GCC 134 has gone down or that GCC 134 is no longer viable, DTPMs 148, 168, and 188 will communicate amongst themselves to promote their respective GCCs 144, 164, and 184 one level. Notice that in the foregoing described scheme monitoring of the top provider node and promotion of the alternate provider nodes are distributed, which makes the scheme both relatively quick and robust.

While the foregoing has described one embodiment whereby DTPMs learn that GCC 134 is no longer viable by use of keep-alive monitors, in other embodiments the DTPMs become aware of the loss of GCC 134 by such DTPMs constantly "pinging" DTPMs 138, 148, 168, and 188 as to their respective presences.

Figure 5A:
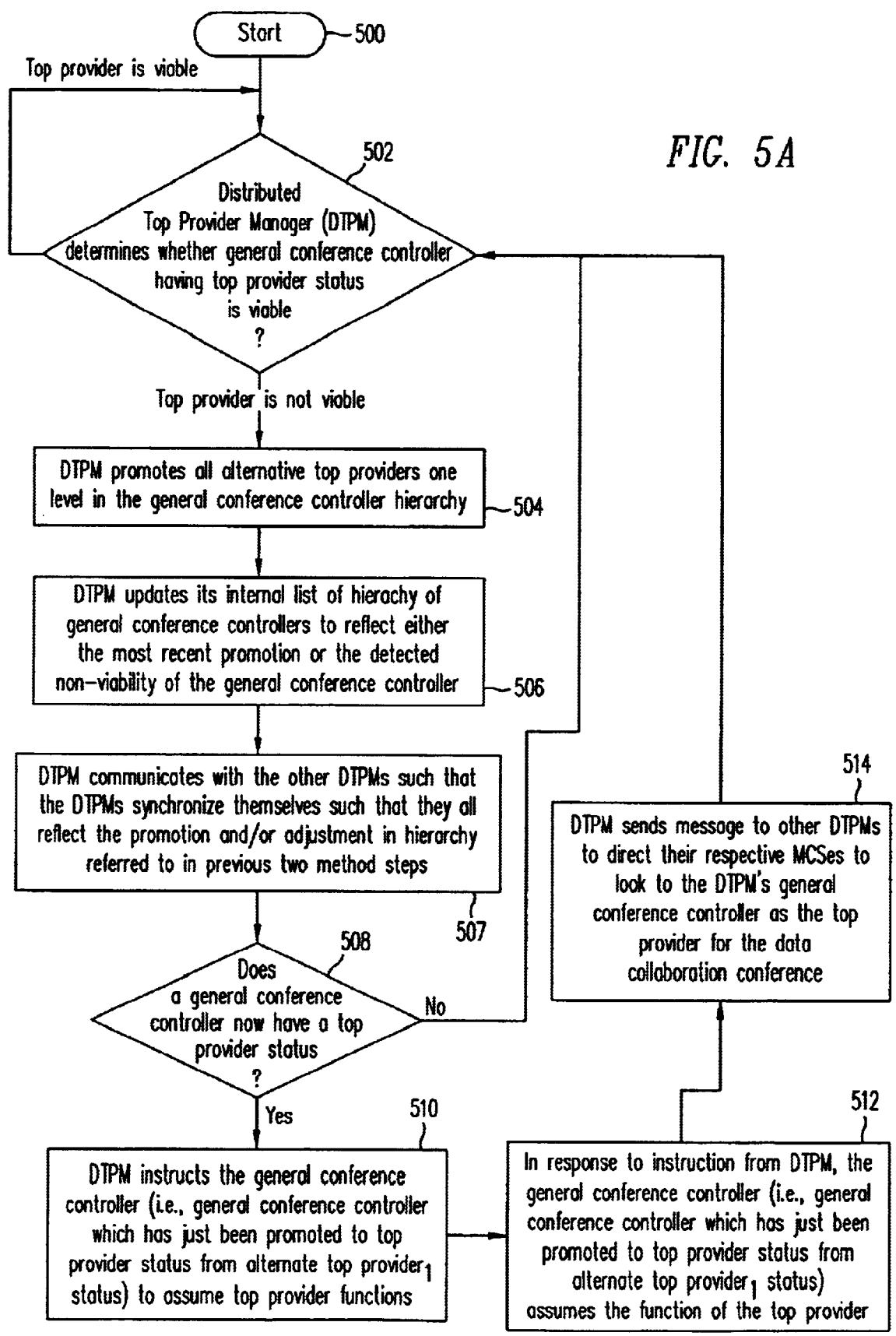
FIGS. 5A and 5B depict a high-level logic flowchart showing a process—generally resident within individual computers such as computers 102, 104, 106, and 108—by which general conference controllers are promoted.
Figure 5B:
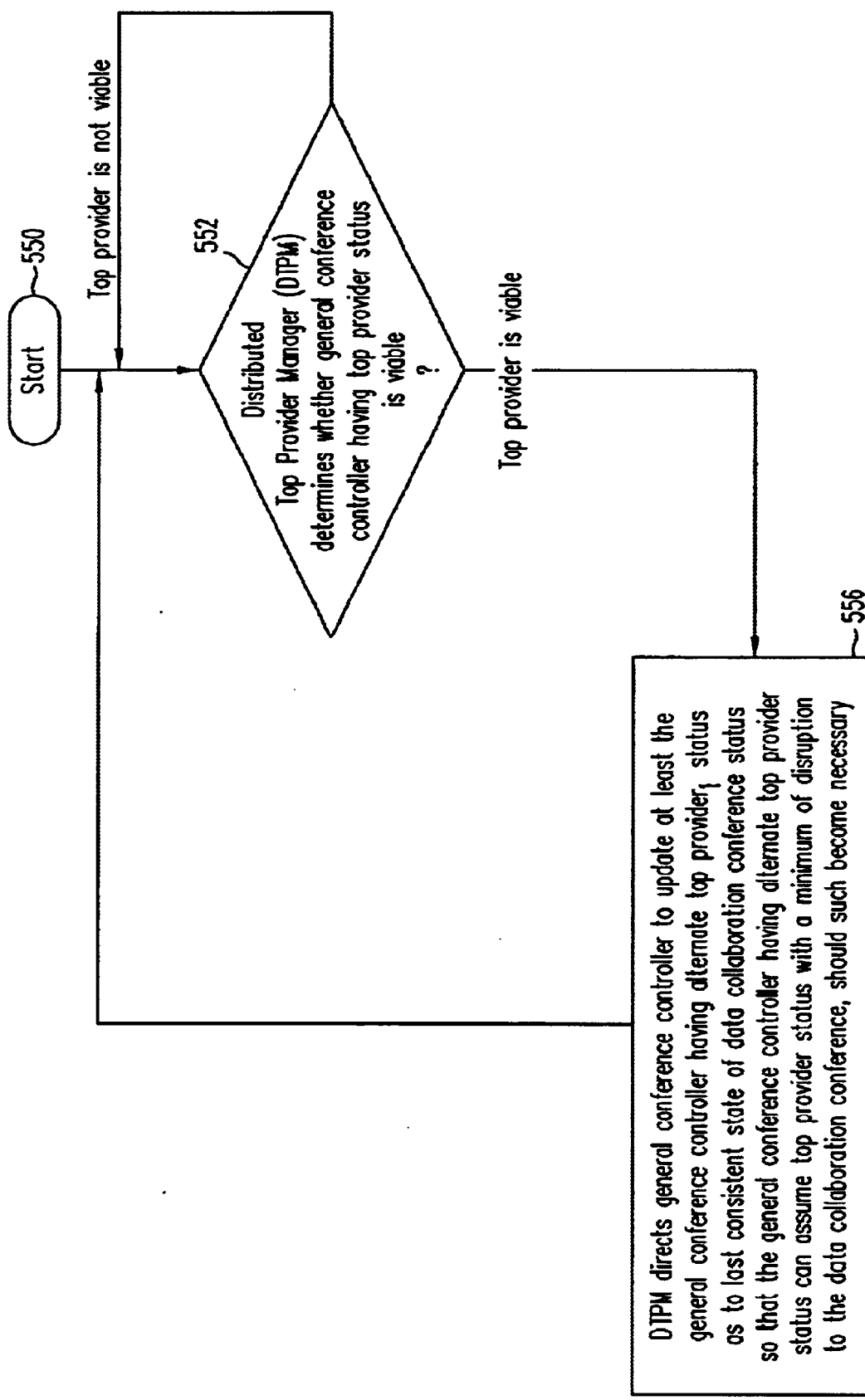

With reference now to FIGS. 5A and 5B, shown are a high-level logic flowcharts showing processes—generally effected by software resident within individual computers such as computers 102, 104, 106, and 108—by which general conference controllers are promoted. Method step 500 shows the start of the process. Method step 502 depicts that a Distributed Top Provider Manager (DTPM) determines whether the general conference controller currently having top provider status is viable.

In the event that the inquiry depicted in method step 502 indicates that the general conference controller currently having top provider status is viable, the process proceeds to method step 502 (i.e., loops). In the event that the inquiry depicted in method step 502 indicates that the general conference controller currently having top provider status on-line is NOT viable, the process proceeds to method step 504 wherein is shown that the DTPM promotes all general conference controllers having alternate top provider statuses one level up in the hierarchy of general conference controllers. Thereafter, method step 506 depicts that the DTPM updates its internal list of general conference controller alternate top providers hierarchy to reflect the most recent promotion of general conference controllers (e.g., such as was discussed in relation to method step 504). Subsequently, method step 507 illustrates that the DTPM communicates with the other DTPMs such that the DTPMs synchronize themselves so that they all reflect the promotion and/or adjustment in hierarchy described in relation to method step 506. Thereafter, the process proceeds to method step 508 wherein is shown an inquiry as to whether a general conference controller has been promoted to top provider status.

In the event that the inquiry of method step 508 yields a determination that a general conference controller has been promoted to top provider status, the process proceeds to method step 510 wherein is shown that the DTPM instructs the general conference controller (e.g., the general conference controller which has just been promoted to top provider status from alternate top provider$_1$ status) to assume top provider functions. Thereafter, method step 512 depicts that, in response to instruction from the DTPM, the general conference controller (e.g., the general conference controller which has just been promoted to top provider status from alternate top provider$_1$ status) assumes the function of the top provider. Thereafter, method step 514 illustrates that a DTPM, whose general conference controller has assumed top provider functions, sends messages to other DTPMs to direct the MCSes over which those other DTPMs have control (e.g., MCS 142 is under the control of DTPM 148) to thereafter direct such other DTPMs' MCSes to look to the general conference controller over which the DTPM has control (e.g., that general conference controller referred to in method step 508) as the general conference controller having top provider status. Subsequently, insofar as the respective MCSes are now directed to the new general conference controller having top provider status, such MCSes can resynchronize with the new general conference controller having top provider status such that the change in top providers is substantially instantaneous and relatively undetectable by the humans participating in the data collaboration conference.

Subsequent to method step 514, the process proceeds to method step 502 and continues from that point.

With reference now to FIG. 5B, illustrated is a process, which proceeds substantially simultaneously with the process depicted in FIG. 5A, whereby it is ensured that at least one general conference controller having an alternate top provider status is kept current as to the state of the data collaboration conference maintained by the general conference controller having top provider status. Method step 550 shows the start of the process. Method step 552 depicts that a Distributed Top Provider Manager (DTPM) determines whether a general conference controller currently having top provider status is viable.

In the event that the inquiry depicted in method step 552 indicates that the general conference controller currently having top provider status is NOT viable, the process proceeds to method step 552 (i.e., "loops"); that is, the process keeps looping through method step 552 until it is detected that a viable general conference controller has been promoted to top provider status (e.g., such as by the process illustrated in FIG. 5A) In the event that the inquiry depicted in method step 552 indicates that the general conference controller currently having top provider status is viable, the process proceeds to method step 556 wherein is shown that the DTPM directs a general conference controller to update at least the general conference controller having alternate top provider$_1$ status (in other embodiments, more than one alternate top provider is so updated) as to the last consistent state of the data collaboration conference (such updating is done so that the general conference controller having alternate top provider status$_1$ can assume top provider status with a minimum of disruption to the data collaboration conference, should such become necessary). Thereafter, the process proceeds to method step 552 and continues from that point. Consequently, the process of FIG. 5A keeps one or more general conference controllers having alternate top provider statuses current as to the state of the data collaboration conference.

Figure 6:
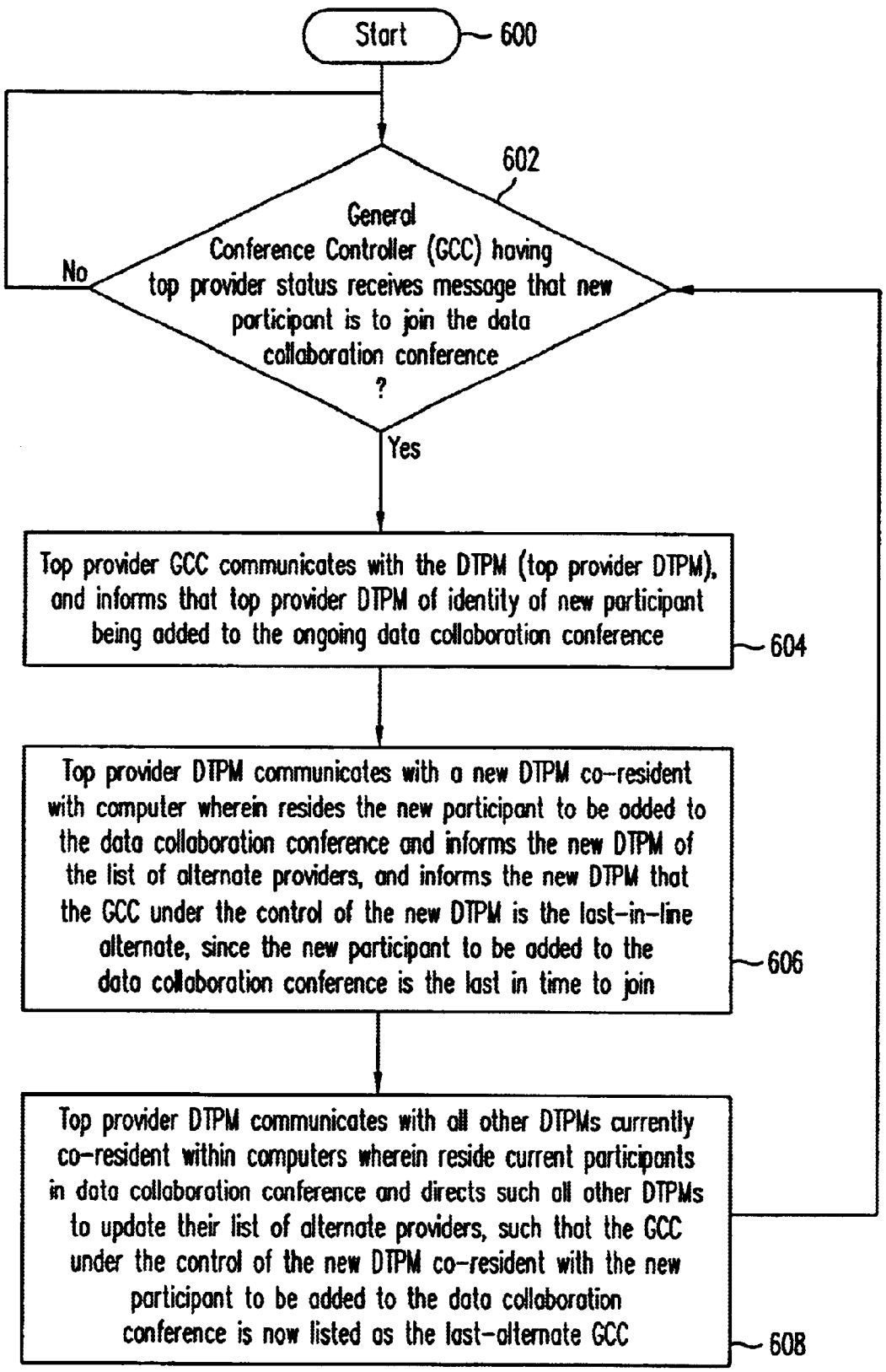
FIG. 6 is a high-level logic flowchart depicting how the hierarchy of GCCs is managed when a party joins the data collaboration conference.

Referring now to FIG. 6, shown is a high-level logic flowchart depicting how the hierarchy of GCCs is managed when a party joins the data collaboration conference. Method step 600 illustrates the start of the process. Method step 602 shows an inquiry as to whether the General Conference Controller (GCC) having top provider status has received a message that a new participant is to join the data collaboration conference.

In the event that the inquiry of method step 602 yields a determination that no new participant is to join the data collaboration conference, the process proceeds to method step 602 (i.e., loops). In the event that the inquiry of method step 602 yields a determination that a new participant is to join the data collaboration conference, the process proceeds to method step 604 wherein is depicted that the top provider GCC communicates with the DTPM (top provider DTPM), and informs the top provider DTPM of the identity of the new participant being added to the ongoing data collaboration conference. Method step 606 illustrates that in response to receipt of the identity of the new participant to be added, the top provider DTPM communicates with the new participant's DTPM and informs the new participant's DTPM of the hierarchy of GCCs, ranging from the current GCC—top provider all the way down to the GCC belonging to the new participant to be added, where such GCC belonging to the new participant to be added is actually the last alternate GCC, since the new participant is assumed to be the last to join the data collaboration conference.

Method step 608 illustrates that the top provider DTPM communicates with all other DTPMs currently co-resident within computers wherein reside participants currently participating in the data collaboration conference and directs such all other such DTPMs to update their lists of alternate providers, such that the GCC under the control of the new DTPM co-resident with the new participant to be added to the conference call is now listed as the last-alternate GCC. Thereafter, the process proceeds to method step 602 and continues from that point.

The description herein has described a hierarchy of alternate top provider GCCs. In one embodiment, each DTPM resident at each computer within the network which is participating in the data collaboration conference maintains an indexed list of the hierarchy of alternate top providers, updating and modifying the list as participants drop and out of the data collaboration conference. In another embodiment, the DTPMs each maintain a linked-list data structure representative of the hierarchy of alternate top providers. In yet another embodiment, the DTPMs each maintain a double-linked list of data structures representative of the hierarchy of alternate top providers.

The foregoing detailed description has set forth various embodiments of the present invention via the use of block diagrams, flowcharts, and examples. Insofar as such block diagrams, flowcharts, and examples contain one or more functions and/or operations, it will be understood as notorious by those within the art that each function and/or operation within such block diagrams, flowcharts, or examples can be implemented, individually and/or collectively, by a wide range of hardware, software, firmware, or any combination thereof. In one embodiment, the present invention may be implemented via Application Specific Integrated Circuits (ASICs). However, those skilled in the art will recognize that the embodiments disclosed herein, in whole or in part, can be equivalently implemented in standard Integrated Circuits, as a computer program running on a computer, as firmware, or as virtually any combination thereof and that designing the circuitry and/or writing the code for the software or firmware would be well within the skill of one of ordinary skill in the art in light of this disclosure. In addition, those skilled in the art will appreciate that the mechanisms of the present invention are capable of being distributed as a program product in a variety of forms, and that an illustrative embodiment of the present invention applies equally regardless of the particular type of signal bearing media used to actually carry out the distribution. Examples of a signal bearing media include but are not limited to the following: recordable type media such as floppy disks, hard disk drives, CD ROMs, digital tape, and transmission type media such as digital and analogue communication links using TDM or IP based communication links (e.g., packet links).

While particular embodiments of the present invention have been shown and described, it will be obvious to those skilled in the art that, based upon the teachings herein, changes and modifications may be made without departing from this invention and its broader aspects and, therefore, the appended claims are to encompass within their scope all such changes and modifications as are within the true spirit and scope of this invention. Furthermore, it is to be understood that the invention is solely defined by the appended claims. It will be understood by those within the art that if a specific number of an introduced claim element is intended, such an intent will be explicitly recited in the claim, and in the absence of such recitation no such intent is present. For example, as an aid to understanding, the following appended claims may contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to inventions containing only one such element, even when the same claim includes the introductory phrases "one or more" or "at least one" and indefinite articles such as "a" or "an"; the same holds true for the use of definite articles used to introduce claim elements. In addition, even if a specific number of an introduced claim element is explicitly recited, those skilled in the art will recognize that such recitation should typically be interpreted to mean at least the recited number (e.g., the bare recitation of "two elements," without other modifiers, typically means at least two elements, or two or more elements).

What is claimed is:

1. A method comprising:

during a data collaboration conference, monitoring for a presence of a first general conference controller having top provider status; and promoting at least a second general conference controller one level in status hierarchy in response to said monitoring indicating that the first general conference controller is no longer viable, wherein said data collaboration conference is maintained.

2. The method of claim 1, wherein said monitoring for a presence of a first general conference controller having top provider status further includes:

monitoring for the presence of the first general conference controller via a distributed top provider manager resident within a computer system active in a data collaboration conference.

3. The method of claim 1, wherein said promoting at least a second general conference controller one level in status hierarchy in response to said monitoring indicating that the first general conference controller is no longer viable further includes:

promoting a general conference controller having an alternate top provider status to top provider status in response to said monitoring indicating that the first general conference controller is no longer viable.

4. The method of claim 1, wherein said monitoring for a presence of a first general conference controller having top provider status further includes:

at least one distributed top provider manager monitoring a status of the first general conference controller having top provider status.

5. The method of claim 4, wherein said at least one distributed top provider manager monitoring a status of the first general conference controller having top provider status further includes:

the at least one distributed top provider communicating with at least one keep-alive monitor.

6. The method of claim 4, wherein said at least one distributed top provider manager monitoring a status of the first general conference controller having top provider status further includes:

the at least one distributed top provider manager communicating with at least one other distributed top provider manager.

7. The method of claim 1, wherein said monitoring for a presence of a first general conference controller having top provider status further includes:
at least one keep-alive monitor monitoring the status of a node containing the first general conference controller having top provider status.

8. The method of claim 1, wherein said promoting at least a second general conference controller one level in status hierarchy in response to said monitoring indicating that the first general conference controller is no longer viable further includes:
a general conference controller having a second alternate top provider status being promoted to a first alternate top provider status.

9. The method of claim 1, further comprising:
directing that the second general conference controller assume top provider functions, in response to a determination that the second general conference controller has been promoted to top provider status.

10. The method of claim 9, wherein said directing that the second general conference controller assume top provider status, in response to a determination that the second general conference controller has been promoted to top provider status further includes:
determining whether the second general conference controller has been promoted to top provider status.

11. The method of claim 1, further comprising:
reassigning a hierarchy of alternate general conference controllers in an event that one or more alternate general conference controllers become not viable.

12. The method of claim 11, wherein said reassigning the hierarchy of alternate general conference controllers in an event that one or more alternate general conference controllers become not viable further comprises:
managing the hierarchy below a first alternate top provider in response to a first alternate top provider's promotion to top provider status.

13. The method of claim 1, further comprising:
informing at least the second general conference controller as to a state of the first conference controller.

14. A system comprising:
during a data collaboration conference, means for monitoring for a presence of a first general conference controller having top provider status; and
means for promoting at least a second general conference controller one level in status hierarchy in response to said means for monitoring indicating that the first general conference controller is no longer viable, wherein said data collaboration conference is maintained.

15. The system of claim 14, wherein said means for monitoring for a presence of a first general conference controller having top provider status further includes:
means for monitoring for the presence of the first general conference controller via a distributed top provider manager resident within a computer system active in a data collaboration conference.

16. The system of claim 14, wherein said means for promoting at least a second general conference controller one level in status hierarchy in response to said means for monitoring indicating that the first general conference controller is no longer viable further includes:
means for promoting a general conference controller having an alternate top provider status to top provider status in response to said means for monitoring indicating that the first general conference controller is no longer viable.

17. The system of claim 14, wherein said means for monitoring for a presence of a first general conference controller having top provider status further includes:
means for monitoring a status of the first general conference controller having top provider status.

18. The system of claim 17, wherein said means for monitoring a status of the first general conference controller having top provider status further includes:
means for communicating with at least one keep-alive monitor.

19. The system of claim 17, wherein said means for monitoring a status of the first general conference controller having top provider status further includes:
means for communicating with at least one other distributed top provider manager.

20. The system of claim 14, wherein said means for monitoring for a presence of a first general conference controller having top provider status further includes:
means for monitoring the status of a node containing the first general conference controller having top provider status.

21. The system of claim 14, wherein said means for promoting at least a second general conference controller one level in status hierarchy in response to said means for monitoring indicating that the first general conference controller is no longer viable further includes:
means for promoting a general conference controller having a second alternate top provider status to a first alternate top provider status.

22. The system of claim 14, further comprising:
means for directing that the second general conference controller assume top provider functions, in response to a determination that the second general conference controller has been promoted to top provider status.

23. The system of claim 22, wherein said means for directing that the second general conference controller assume top provider status, in response to a determination that the second general conference controller has been promoted to top provider status further includes:
means for determining whether the second general conference controller has been promoted to top provider status.

24. The system of claim 14, further comprising:
means for reassigning a hierarchy of alternate general conference controllers in an event that one or more alternate general conference controllers become not viable.

25. The system of claim 24, wherein said means for reassigning the hierarchy of alternate general conference controllers in an event that one or more alternate general conference controllers become not viable further comprises:
means for managing the hierarchy below a first alternate top provider in response to a first alternate top provider's promotion to top provider status.

26. The system of claim 14 further comprising: means for informing at least the second general conference controller as to a state of the first conference controller.

27. A program product comprising:
signal bearing media bearing software operable to perform the following steps: during a data collaboration conference, monitoring for a presence of a first general conference controller having top provider status; and promoting at least a second general conference controller one level in status hierarchy in response to said means for monitoring indicating that the first general conference controller is no longer viable, wherein said data collaboration conference is maintained.

28. The program product of claim 27, wherein said signal bearing media comprises transmission media.

29. The program product of claim 27, wherein said signal bearing media comprises recordable media.

30. The program product of claim 27, wherein signal bearing media bearing software is further operable to perform the following step:

reassigning a hierarchy of alternate general conference controllers in an event that one or more alternate general conference controllers become not viable.

31. The program product of claim 30, wherein said signal bearing media comprises transmission media.

32. The program product of claim 30, wherein said signal bearing media comprises recordable media.

33. The program product of claim 27:

wherein signal bearing media bearing software is further operable to perform the following step:

informing at least the second general conference controller as to a state of the first conference controller.

34. The program product of claim 33, wherein said signal bearing media comprises transmission media.

35. The program product of claim 33, wherein said signal bearing media comprises recordable media.

36. A system comprising:

a network interface;

a keep-alive monitor; and a distributed top provider manager (DTPM) configured to:

during a data collaboration conference, monitor for a presence of a first general conference controller having top provider status; and promote at least a second general conference controller one level in status hierarchy in response to said monitoring indicating that the first general conference controller is no longer viable, wherein said data collaboration conference is maintained.

37. The system of claim 36, wherein said DTPM is resident within a computer system active in a data collaboration conference.

38. The system of claim 36, wherein said DTPM is further configured to:

promote a general conference controller having an alternate top provider status to top provider status in response to said monitoring indicating that the first general conference controller is no longer viable.

39. The system of claim 36, wherein said DTPM is further configured to communicate with said at least one keep-alive monitor.

40. The system of claim 36, wherein said DTPM is further configured to communicate with at least one other DTPM of another system.

41. The system of claim 36, wherein said keep-alive monitor is configured to: monitor the status of a node containing the first general conference controller having top provider status.

42. The system of claim 36, wherein said DTPM is further configured to:

promote a general conference controller having a second alternate top provider status to a first alternate top provider status.

43. The system of claim 36, wherein said DTPM is further configured to:

direct that the second general conference controller assume top provider functions, in response to a determination that the second general conference controller has been promoted to top provider status.

44. The system of claim 43, wherein said DTPM is further configured to:

determine whether the second general conference controller has been promoted to top provider status.

* * * * *